United States Patent [19]
Acebo et al.

[11] Patent Number: 6,023,679
[45] Date of Patent: *Feb. 8, 2000

[54] PRE- AND POST-TICKETED TRAVEL RESERVATION INFORMATION MANAGEMENT SYSTEM

[75] Inventors: Alicia Gonzalez Acebo, Coconut Grove; Christopher David Frawley, Miami Beach, both of Fla.

[73] Assignee: Amadeus Global Travel Distribution LLC, Miami, Fla.

[*] Notice: This patent issued on a continued prosecution application filed under 37 CFR 1.53(d), and is subject to the twenty year patent term provisions of 35 U.S.C. 154(a)(2).

[21] Appl. No.: 08/769,580

[22] Filed: Dec. 19, 1996

Related U.S. Application Data

[63] Continuation of application No. 08/317,860, Oct. 4, 1994, abandoned.

[51] Int. Cl.[7] .................................................. G06F 153/02
[52] U.S. Cl. ..................................................... 705/5; 705/6
[58] Field of Search ....................... 705/5, 6; 340/825.28, 340/825.29; 283/53, 55, 56; 379/93.12

[56] References Cited

U.S. PATENT DOCUMENTS

| | | |
|---|---|---|
| 4,779,080 | 10/1988 | Coughlin et al. . |
| 4,827,404 | 5/1989 | Barstow et al. . |
| 4,862,357 | 8/1989 | Ahlstrom et al. . |
| 4,885,685 | 12/1989 | Wolfberg et al. . |
| 4,922,439 | 5/1990 | Greenblatt . |
| 4,937,743 | 6/1990 | Rassman . |
| 5,021,953 | 6/1991 | Webber et al. ........................... 364/407 |
| 5,125,091 | 6/1992 | Stass et al. . |
| 5,191,523 | 3/1993 | Whitesage ................................ 364/407 |
| 5,237,499 | 8/1993 | Garback . |
| 5,253,166 | 10/1993 | Dettelbach et al. ..................... 364/407 |

FOREIGN PATENT DOCUMENTS

WO8501814  10/1984  WIPO ............................... G06F 9/36

OTHER PUBLICATIONS

System One, (Apr. 22–24, 1994). IMS brochure.

System One, (Apr. 22, 1994). News Release. System One Introduces Smartmail to Travel Agencies Interested in Saving Time, Reducing Errors & Attractin More Business, pp. 1–3.

Brisson, Mary, (Apr. 18, 1994). Business Travel News. System One Reinvents Itself, p. 1(continued) System One's New Self–View: Info Provider, p. 32, Issue 286.

Fairlie, Rik, (Mar. 21, 1994). Travel Weekly. System One Moves to Synergize its Systems, Software, p. 51 (continued) System One Plans Service–Bureau Approach to Some Products, p. 54.

Finlay, Douglas, (Jan. 10, 1994). Travel Agent. RES Systems / Automation Upgrading the System.

(List continued on next page.)

*Primary Examiner*—Frantzy Poinvil
*Attorney, Agent, or Firm*—Jenkens & Gilchrist, A Professional Corporation

[57] ABSTRACT

Methods and system for effecting the instantaneous data transmission to a locally operated computer system upon an occurrence in the computer reservation system (CRS). Specifically, a method for automatically generating pre-ticketed travel information is disclosed, in which booked reservation information and traveler information in a is automatically transmitted to a locally operated computer system as soon as the booking of the reservation is complete. When the reservation information included more that one travel transaction, such as an air transaction, a hotel transaction and a rental car transaction, the traveler and reservation information is stored in a manner to track common information between different travel transactions, such as sale information, rather than track individual travel transactions. Also, a method of automatically updating an existing customer profile in a locally operated computer system upon the detection of the update of the corresponding customer profile in a (CRS) is discussed.

20 Claims, 23 Drawing Sheets

OTHER PUBLICATIONS

Finlay, Douglas, (Nov. 8, 1993). Travel Agent. From CRS to IMS.

D'Ambrosio, Richard, (May 3, 1993). Business Travel News. Future On Display At System One Conference.

Fairlie, Rik, (Apr. 26, 1993). Travel Weekly. System One Unveils Enhancements, New Products at Annual Meeting.

System One Corporation, (1991). *MAX for the AS/400* brochure. (MXSB 891.).

System One Corporation, (1991). *MAX for the AS/400* brochure. (SIMA 891.).

```
SALES PERSON: 32            ITINERARY          DATE: 30 APR 90
CUSTOMER NBR: 010200        QKSOBV PAGE: 1
  To: ABC COMPANY
      25701 ABC PARK DR
      BEACHWOOD OH 44122

FOR: TRAVELER/JOHN          REF: 4150          ADV: AH1D8730

02 MAY 90 - WEDNESDAY

AIR    DELTA AIR LINES INC  FLT : 379   COACH
          LV CLEVELAND                     715A    EQP: 727 STRETCH
          AR CINCINNATI                    813A    NON - STOP

AIR    DELTA AIR LINES INC  FLT : 687   COACH          BREAKFAST
          LV CINCINNATI                    905A    EQP: 737 STRETCH
          AR HOUSTON  HOBBY                1030A   NON - STOP

CAR    OKLAHOMA CITY NATIONAL CAR RENTAL         1-STD CAR AUTO A/C
          PICK UP - 6P
          RETURN - 03 MAY
          CONFIRMATION NUMBER  0525607545

HOTEL  ES EMBASSY SUITES OKLAHOMA CI    01 NIGHT OUT - 03 MAY
          OKLAHOMA  CITY                   1 ROOM CORPORATE
          1815 SOUTH MERIDIAN              RATE - 75.00 PER NIGHT
          OKLAHOMA  CITY  OK  73108        GUARANTEED LATE ARRIVAL
          FONE  405 - 682 - 6000           CONFIRMATION 64469071

03 MAY 90 - THURSDAY

AIR    UNITED AIRLINES    FLT : 2872  ECONOMY
          LV HOUSTON  HOBBY                310P    EQP: ATP PROPLR
          AR CHICAGO  OHARE                400P    NON - STOP

AIR    UNITED AIRLINES    FLT : 998   ECONOMY
          LV CHICAGO OHARE                 505P    EQP: DC-8 STRETCH
          AR CLEVELAND                     716P    NON - STOP
             RESERVED SEATS 21B

U1 - DEPT. 4150
U2 - AUTH. 1249
U3 - 0425 A1 C5 H5 T2 / Y
U4 - 928      FARE
U5 - 1044     COACH FARE
U6 - 928      LOW FARE
U7 - 45       DAILY RATE
```

*FIG. 3*

```
IMR6#009
7E0315#7E0319
HDQCOAUXTR6#12777777#112345
A-
B-M:P21#TAW/23MAR
C-OO55X DP
D-041090#041190#041190
E-CHECK
F-
FF-
G-8###
H-010MIAMIAMI FLA.#CO0008F 01DEC1030A0103P01DEC#OK#L-#0#L10#M##
H-00EWRNYC NEWARK#VOID
H-030BOSBOSTON#CO0149F 03DEC0730A1013A03DEC#OK#B-#0#727###
H-040ATLATLANTA#COOPENF
H-0050MIAMIAMI FLA.#CO0008F 01FEB1030A0103P01FEB#LL#L-#0#L10#M##
H-060BOSBOSTON#CO0149F 03FEB0730A0840A03FEB#LL#B-#0#727###
H-00EWRNYC NEWARK#VOID
H-02CCR HERTZ#ZE#01DEC HK1#NYC NEWARK#EWR#02DEC INTERMEDIATE CAR#ICAR
#BS-12777777#SI-NEED BABY SEAT##PUP-NEWARK AIRPORT#DO-NEWARK AIRPORT
#ID-12344###RC-SD1223#**-FREEFLOW ACCOUNTING INFO
H-06HTL CO HK1 NYC IN01DEC
#OUT 3DEC-CF-9182737SONESTA-RATE 75.00##
H-07HHL AH HK1 ATL IN03DEC OUT04DEC 101 1A2D#TA12777777##TTL5600
###G-...1832 NW 185 TERR...SMYRNA GA
#HOTEL TOWER PLACE#3340 PEACHTREE ROAD#ATLANTA GEORGIA 30026
305-873-0115 404 231-1234##
H-08MIS CLUB NAUTICO#IY#01DEC HK1#NEW YORK#NYC
#TICKETS FOR CATS-45.00 PER PERSON##
H-09TUR CO 01OCT HK1-NEW YORK#10OCT#$IT3EA1XXXX$# TTL$200.00
#HOTEL WALDORF ASTORIA#TRANSFERS##
H-10ATX CO 20NOV#WEST PALM BEACH#MIAMI #RQ1
#/TILFORD FLYING SERVICE#**-FREEFLOW AREA
I-HEWING/A JR#ADT#ID12345#MIA 305 873-0119
S-01YN16A##03YS28C
J-CO-AGHE4H3
K-USD917.59##US73.41###USD991.00
KK-
L-US26.67##
M-F4#VOID#F#F
MM-
N-255.56#VOID#349.07#312.96
NN-
O-XXXX#XXXX#XXXX#XXXX
OO-
Q-1DEC90 MIA CO EWR Q1.85 253.71F4 /-BOS CO ATL 349.07F CO MIA
Q-312.96F USD917.59END
QQ-
*FP CHECK
*FP CASH
*IT TOURCODE12
*CM 10
*AN 112345
*MR HAVE A PLEASANT TRIP
*MR PLEASE REMEMBER TRIP VOUCHERS
*AN 112345
END
```

*FIG. 4*

| Name | Size | Description |
| --- | --- | --- |
| Tran_ID | tid | Unique Transaction ID for the record locator |
| Sales_ID | sid | Unique to identify sale |
| Account_ID | orgid | ID of how the sale is going to be posted to accounting |
| Agent_BKG | 3 characters | Agent who booked the IMR or AIR |
| Agent_TKT | 3 characters | Agent who ran the ticket or invoice |
| Base_Fare | money | Base amount of the sale (excludes taxes) |
| Billable_Amt | money | Amount that will be billed for the sale (includes taxes/fees) |
| Billing_ID_FL | 2 characters | Separate invoice information for who pays IE P psgr_name |
| Confirm_Num | smallint null | Confirmation Number of Hotels, Cars & Misc. |
| Cost_Factor_CD | 10 characters | SATO offices only used in conjunction with validating carrier |
| Currency_Type_CD | 3 characters | Code indicates the currency type for the sale |
| Intl_Dom_CD | 1 character | Domestic or International |
| End_Date | smalldatetime | Completion date & time of the sale |
| Exchange_FL | 1 character | Indicates a sale has been exchanged |
| Fail_CD | 2 characters | Pricing Code |
| Interface_Seq_Num | 6 characters | Interface sequence number for IMR and AIR |
| Invoice_Date | 8 characters | Date the invoice is run |
| Invoice | 10 characters | Invoice number if Pre than null (KEY) |
| Invoice_Type_Code | 2 characters | Original or dependent on another invoice ?? |
| Manual_System_F1 | 1 character | To note manual or system generated invoice |
| Org_ID | orgid | ID for reports |
| Paid_In_Full | datetime | Date when all payments have been made for sale |
| Post_Date | Datetime | Posting date for A/R |
| Refund_FL | 1 character | Indicates a sale has been refunded |
| Refundable_FL | 1 character | If a sale can be refunded |
| Reportable_Doc_FL | 1 character | If a sale is reportable or not |

*FIG. 6a*

| | | |
|---|---|---|
| Sale_Type_CD | 4 characters | More detail of sale i.e. MCO, PTA, Cruse, Tour, Bus etc |
| Start_City | 3 characters | City where the sale starts |
| Start_Date | Datetime | Date when the sale starts |
| Ticket_Conjun_Num | 4 characters | Conjunction ticket number |
| Ticket_Num | 11 characters | Ticket number for Misc it can be a Tour ID number |
| Ticketed_FL | 1 character | When a ticket has been generated |
| Train_Property_Type | 3 characters | Type of accommodation |
| Psgr_Name | 30 charcters | Name of traveler on trip record |
| Total_Fare | money | Total amount of the sale(includes taxes) |
| Traveler_ID | 11 characters | Traveler ID Code |
| Type_Of_Ref | 3 characters | Type of Transaction AIR, Train, Car, Hotel and Misc |
| Vendor | 3 characters | Vendor for the trip (validating carrier for air) |
| Void_FL | 1 character | If sale has been voided |

*FIG. 6b*

RELOCATOR

| Name | Size | Description |
|---|---|---|
| Tran_ID | tid | Unique Transaction ID for the record locator |
| ARC | orgid | ARC number (inc BranchNumber) pointer to ORG Table |
| Booking_Date | small datetime | Original creation date from the host (System One) |
| Counter | int | Pre ticket counter for Tran_ID |
| CRS | 2 characters | CRS used in the booking |
| Pseudo_City | 6 characters | Indicates a code used by American Airlines to identify an agency |
| Recloc | 7 characters | Rrcord Locator from host (System One) |
| Trip_Change_Date | smalldatetime | Last date trip was changed |
| TripPlan_Complt_FL | 1 character | Maintenance program to run and check trip has been completed |

*FIG. 7*

HOTEL

| Name | Size | Description |
| --- | --- | --- |
| Tran_ID | tid | Unique Transaction ID for the record locator |
| Sales_ID | sid | Unique to identify sale |
| Corporate_ID | 29 varcharacters | Corporate ID to identify customer and rate |
| Currency_Type_CD | 3 characters | Currency Code for rate (International) |
| Deposit_Info | 31 varcharacters | Deposit Information |
| Freq_Trav_Cust_ID | 21 varcharacters | Customer (guest) ID number |
| Guaranteed_CC | 31 varcharacters | Credit Card Number |
| Hotel_Property_ID | 8 characters | Unique Property ID for hotels |
| Hotel_Room_Type_CD | 10 characters | Defines room category code or Room Override |
| Neg_Rate_CD | 2 characters | Special Rate for Agency or Promo or Negotiated Rate |
| Num_in_Room | 2 characters | Number in room |
| Num_of_Room | 2 characters | Number of rooms |
| Rate_Guar_Quote_FL | 1 character | Flag indicating if the base fare amt (Sales tbl) is a quote |
| Rate_Info | 25 varcharacters | Guaranteed rate or quoted rate |
| Rate_Plan | 11 characters | Rate pertaining to A-Agency, N-Negotiated, or P-Promotional |
| Room_Override_Info | 08 characters | Description of room i.e. SGLB |
| Status_CD | 2 characters | Status of sale I.E. confirmed, waitlisted or denied |
| Supplemental_Info | 45 varcharacters | Supplemental Information |

*FIG. 8*

SEGMENT

| Name | Size | Description |
|---|---|---|
| Tran_ID | tid | Unique Transaction ID for the record locator |
| Sales_ID | sid | Unique to identify sale |
| Segment_Num | smallint not null | Number of each segment for sale (coupon number) |
| Aircraft_Eqp_CD | 3 characters | Equipment type of aircraft |
| Arrive_City | 3 characters | Arrival City |
| Arrive_Date_Time | Datetime | Date of Arrival |
| Carrier_CD | 3 characters null | Carrier for each segment |
| Connection_FL | 1 character null | Flag that indicates a connecting segment |
| Currency_Type_CD | 3 characters | Currency Code for the segment |
| Depart_City | 3 characters | Departure City |
| Depart_Date_Time | smalldateline | Date and time of departure |
| Fare_CD | 13 characters | Fare Basis of ticket KXAP, OXAP, etc. |
| Fare_Class | 2 characters | Fare class I.E. Y, F, FN, YN |
| Flight_Num | 5 characters | Flight or Train number |
| Meal_Assignment_CD | 2 characters | Kosher, Hindu, No Salt |
| Num_Of_Stops | smallint | Number of stops on an air or train segment |
| Refund_Exch_CD | 2 characters | Refundable segment, exchanged or Both |
| Sales_Type_CD | 2 characters | Type of sale A = Air, T = Train |
| Seat_Assignment | 3 characters | Seat Assignment |
| Segment_Amount | money | Fare amount of the segment |
| Segment_Type | 3 characters | For Amtrack sale will be train, bus or ship |
| Status_CD | 2 characters | Code that denotes status of segment (HK, WL, TK etc.) |
| Tariff_CD | 4 characters | Amtrack Segments |
| Validity_Dates | 10 characters | Dates segments are valid |

*FIG. 9*

CAR

| Name | Size | Description |
|---|---|---|
| Tran_ID | tid | Unique Transaction ID for the record locator |
| Sales_ID | sid | Unique to identify sale |
| Car_Quality | smallint | Number of cars booked |
| Car_Type_CD | 4 characters | Code for car type booked |
| Corporate_ID | 29 varcharacters | Corporate ID to identify customer and rate |
| Drop_City | 3 characters | Return car location |
| Drop_Info | 143 varcharacters | Drop Off location information |
| Drop_Off_Charge_Amt | money | Drop Off charge amount |
| Drop_Off_Charge_Curr_Type_CD | 3 characters | Currency code for the drop off charge |
| Freq_Trav_Cust_ID | 15 characters | Customer ID number |
| Guaranteed_CC | 31 varcharacters | How car is guaranteed I.E. Credit Card |
| Pickup_Info | 142 varcharacters | Location where car is to be picked up |
| Rate_Categ_Code_Info | 5 characters | Rate Category Information |
| Rate_Guar_Quote_FL | 1 character | Flag indicating if the base fare amt (Sales tbl) is a quote |
| Rate_Info | 25 varcharacters | Guaranteed rate or quoted rate |
| Rate_Rental_CD | 6 characters | Identifies rate as daily, weekly or flat |
| Status_CD | 2 characters | Statues or sale I.E. confirmed, waitlisted or denied |
| Special_Req_od | 107 varcharacters | Special equipment request max is four |
| Supplemental_Info | 75 varcharacters | Supplemental Information |

*FIG. 10*

MISCELLANEOUS

| Name | Size | Description |
|---|---|---|
| Tran_ID | tid | Unique Transaction ID for the record locator |
| Sales_ID | sid | Unique to identify sale |
| Description | 40 varcharacters | Description or Tour name |
| Num_in_Trip | 2 characters | Number in Trip |
| Status_CD | 2 characters | Status of sale I.E. confirmed, waitlisted or denied |
| Supplemental_Info | 40 varcharacters | Supplemental Information |
| Sales_Type_CD | 2 characters | Type Misc. Cruise, etc |

*FIG. 11*

TAXES/FEES

| Name | Size | Description |
|---|---|---|
| Tran_ID | tid | Unique Transaction ID for the record locator |
| Sales_ID | sid | Unique to identify sale |
| Segment_Num | smallint | Sequence Number for uniqueness |
| Seq_Num | smallint | To record taxes and fees at the segment level |
| Type_ID_CD | 3 characters | Type of Tax I.E. XT, UX etc |
| Currency_Type | 3 characters | Currency Type |
| Post_Acct_FL | 1 character | Flag to indicate it has been sent to accounting |
| Tax_Fee_Amt | money | Amount of taxes or fee |
| Tax_Fee_FL | 1 character | To distinguish taxes and fees |

*FIG. 12*

COMMISSION

| Name | Size | Description |
|---|---|---|
| Tran_ID | tid | Unique Transaction ID for the record locator |
| Sales_ID | sid | Unique to identify sale |
| Segment_Num | smallint | Unique to identify segment number (split commission) |
| Seq_Num | smallint | Unique to identify sequence |
| Comm_Amt | smallint | Dollar amount commission |
| Comm_Currency_Type_CD | 3 characters | Currency type used for this transaction (sale) |
| Comm_Percentage_Rate | smallint | Percentage amount commission |
| Pay_ID | int | Unique to identify payments (Money Transaction) |
| Post_Acct_FL | 1 character | Flag to indicate it has been sent to accounting |

*FIG. 13*

MONEY TRANSACTION

| Name | Size | Description |
|---|---|---|
| Tran_ID | tid | Unique Transaction ID for the record locator |
| Sales_ID | sid | Unique to identify sale |
| Pay_ID | int | Unique to identify payment |
| Adj_CD | 3 characters | Codes for adjustments to a sale I.E. EX, EO, CK |
| CC_Approval_CD | 6 characters | Approval Code for the credit card |
| CC_Approval_Ind | 1 character | Identifies if approval is manual or host generated |
| CC_Exp_Date | datetime | Approval date for the credit card |
| Currency_Amt | smallint | Dollar amount of payment |
| Currency_Type_CD | 3 characters | Currency type used for this transaction (sale) |
| Doc_ID_CD | 2 characters | Credit Card Code I.E. AX, CA, VI etc |
| Doc_Name | 20 characters | Credit Card number or ticket number |
| FOP_CD | 2 characters | Form of payment |
| Payment_Date | datetime | Date payment is received |
| Post_Date | Datetime | Posting date for A/R |
| Total_Tax_Refund_Amt | money | Total amount of taxes |

*FIG. 14*

REVENUE SHARING

| Name | Size | Description |
| --- | --- | --- |
| Account_ID | orgid | Organization group name that sale amount will be posted |
| Agent_ID | Agentid | Agent's ID Originally getting commission |
| Pay_ID | int | Identifies Unique payment - link to comm table for refunds |
| Sale_Type_CD | 2 characters | Describes type of sale (Air, Car, Hotel) |
| Option_CD | 2 characters | Describes method of distribution allocations of commission |
| Percentage_Amt | smallint | Percentage amount of commission I.E. 10% |
| Flat_Comm_Amt | money | Flat amount of commission that can be taken |
| Comm_Start_Date | Datetime | Date the commission begins |
| Comm_End_Date | Datetime | Date the commission ends |
| Share_Perc_Amt | smallint | Percentage amount to be shared I.E. 50% or 10% |
| Share_Per_1 | Agentid | Agent_ID shares with share_person 1 percentage amount |
| Share_Per_1_Perc_Amt | smallint | Percentage amount Share P. 1 recvs from Agent_ID |
| Share_Per_Amt | smallint | Agent_ID shares with share_person 2 percentage amount |
| Share_Per_2 | Agentid | Percentage amount Share P. 2 recvs from Agent_ID |
| Share_Per_2_Perc_Amt | smallint | Percentage amount Share P. 1 recvs from Agent_ID |

*FIG. 15*

ORGANIZATION

| Name | Size | Description |
|---|---|---|
| ORG_ID | orgid | Organization ID or ARC number, aka Account ID in sales table |
| Parent_Org_ID | orgid | Parent Organization Code or ARC # |
| Org_Name | 40 characters | Name of the organization or Agy Name |
| Supervisor_ID | 30 characters | Supervisor Name |
| DBA | 25 characters | To be defined by the user |
| Add_Bus_Ln1 | 25 varcharacters | Line 1 of Address 1 |
| Add_Bus_Ln2 | 25 varcharacters | Line 2 of Address 1 |
| Add_Bus_Ln3 | 25 varcharacters | Line 3 of Address 1 |
| Add_Bus_City | 25 varcharacters | Address 1 City |
| Add_Bus_Region | 3 characters | Address 1 State |
| Add_Bus_Country | 12 varcharacters | Address 1 Country |
| Add_Bus_PostCode | 9 varcharacters | Address 1 Postal Code |
| Add_Deliv_Ln1 | 25 varcharacters | Line 1 of Address 2 |
| Add_Deliv_Ln2 | 25 varcharacters | Line 2 of Address 2 |
| Add_Deliv_Ln3 | 25 varcharacters | Line 3 of Address 2 |
| Add_Deliv_City | 25 varcharacters | Address 2 City |
| Add_Deliv_Region | 3 characters | Address 2 State |
| Add_Deliv_Country | 12 varcharacters | Address 2 Country |
| Add_Deliv_PostCode | 9 varcharacters | Address 2 Postal Code |
| Add_Other_Ln1 | 25 varcharacters | Line 1 of Address 3 |
| Add_Other_Ln2 | 25 varcharacters | Line 2 of Address 3 |
| Add_Other_Ln3 | 25 varcharacters | Line 3 of Address 3 |
| Add_Other_City | 25 varcharacters | Address 3 City |
| Add_Other_Region | 3 characters | Address 3 State |
| Add_Other_Country | 12 varcharacters | Address 3 Country |
| Add_Other_PostCode | 9 varcharacters | Address 3 Postal Code |

*FIG. 16a*

| | | |
|---|---|---|
| Branch_STP_CD | 2 characters | Identifies if a branch is an STP location Branch = "B", Main Office = "M", STP = "S", Null = No Agency |
| Billing_CD | 10 characters | Identifies which Co/Dept is to be billed for trip |
| Contact_Name | int null | to be determined by the user |
| Contact_Name_Phn | int null | phone number |
| Phone_Bus | int null | phone number |
| Phone_Bus_Alt | int null | phone number |
| Phone_Fax | int null | phone number |
| Phone_Other | int null | phone number |
| Policy_ID | 11 characters | Key into Policy Table (Dictates policy travel for organization) |
| Tax_ID | 10 characters | to be determined by the user |

*FIG. 16b*

TRAVEL

| Name | Size | Description |
| --- | --- | --- |
| Traveler_ID | 11 characters | Traveler ID |
| Org_ID | 11 characters | Organization or Agency ID |
| Add_Bus_Ln1 | 25 varcharacters | Line 1 of Address 1 |
| Add_Bus_Ln2 | 25 varcharacters | Line 2 of Address 1 |
| Add_Bus_Ln3 | 25 varcharacters | Line 3 of Address 1 |
| Add_Bus_City | 25 varcharacters | Address 1 City |
| Add_Bus_Region | 3 characters | Address 1 State |
| Add_Bus_Country | 12 varcharacters | Address 1 Country |
| Add_Bus_PostCode | 9 varcharacters | Address 1 Postal Code |
| Add_Deliv_Ln1 | 25 varcharacters | Line 1 of Address 2 |
| Add_Deliv_Ln2 | 25 varcharacters | Line 2 of Address 2 |
| Add_Deliv_Ln3 | 25 varcharacters | Line 3 of Address 2 |
| Add_Deliv_City | 25 varcharacters | Address 2 City |
| Add_Deliv_Region | 3 characters | Address 2 State |
| Add_Deliv_Country | 12 varcharacters | Address 2 Country |
| Add_Deliv_PostCode | 9 varcharacters | Address 2 Postal Code |
| Add_Home_Ln1 | 25 varcharacters | Line 1 of Address 3 |
| Add_Home_Ln2 | 25 varcharacters | Line 2 of Address 3 |
| Add_Home_Ln3 | 25 varcharacters | Line 3 of Address 3 |
| Add_Home_City | 25 varcharacters | Address 3 City |
| Add_Home_Region | 3 characters | Address 3 State |
| Add_Home_Country | 12 varcharacters | Address 3 Country |
| Add_Home_PostCode | 9 varcharacters | Address 3 Postal Code |
| Agent_ID | Agentid | Agent's ID Originally getting commission |
| Approv_CD | 2 characters | Approval Code for travel |
| CC1 | 18 characters | Credit Card Number 1 |
| CC_CD1 | 2 characters | Credit Card Code 1 |
| CC_Exp1 | 4 characters | Credit Card Exp 1 |

*FIG. 17a*

| | | |
|---|---|---|
| CC2 | 18 characters | Credit Card Number 2 |
| CC_CD2 | 2 characters | Credit Card Code 2 |
| CC_Exp2 | 4 characters | Credit Card Exp 2 |
| DOB | smalldatetime | Traveler Date of Birth |
| DOH | smalldatetime | Traveler Date of Hire |
| Passport_Num | 10 characters | Passport Number |
| Passport_Iss_City | 14 characters | City where passport is issued |
| Name_Position | 25 characters | Name of Traveler or agent |
| Name_Title | 5 characters | Title of Traveler or agent |
| Name_First | 10 characters | Traveler's Name |
| Name_MI | 1 character | Traveler's Name |
| Name_Last | 14 characters | Traveler's Name |
| Phone_Bus | int null | Phone Number |
| Phone_Home | int null | Phone Number |
| Phone_Fax | int null | Phone Number |
| Phone_Other | int null | Phone Number |
| Policy_ID | 11 characters | To be used in the future |
| Sex | 1 character | Sex of traveler or agent |
| SSN_Num | 9 characters | SSN Number |

*FIG. 17b*

ORGANIZATION/TRAVELER

| Name | Size | Description |
|---|---|---|
| Trav_Org_ID | orgid | ID of the Traveler or Organization |
| Trav_Org_FL | 1 character | T = Traveler, O = Organization |

*FIG. 18*

SALES REMARKS TABLE

| Name | Size | Description |
|---|---|---|
| Tran_ID | tid | Unique Transaction ID for the record locator |
| Sales_ID | sid | Unique to identify sale |
| Seq_Num | smallint | Remark Sequence Number to make it unique |
| Remark | 225 varcharacters | Remark information |

*FIG. 19*

SAVINGS

| Name | Size | Description |
|---|---|---|
| Tran_ID | tid | Unique Transaction ID for the record locator |
| Sales_ID | sid | Unique to identify sale |
| Seq_Num | smallint | Sequence Number given by system |
| Saving_Data_CD | 3 characters | Code Depicting type of savings |
| Saving_Amt | money | Amount of savings |

*FIG. 20*

USER DEFINED

| Name | Size | Description |
|---|---|---|
| Tran_ID | tid | Unique Transaction ID for the record locator |
| Sales_ID | sid | Unique to identify sale |
| Seq_Num | smallint | Sequence number given by user |
| User_CD | smallint | User ID Code |
| User_Data | 225 varcharacters | Data information supplied by the user |

*FIG. 21*

INTERFACE REMARK

| Name | Size | Description |
|---|---|---|
| CRS | 2 characters | ID for CRS - I.E. S1 |
| Host_Format | 4 characters | Format from the host I.E. LF, FP |
| Host_Format_Defn | 20 varcharacters | Description of host format code |
| Internal_Format | 4 characters | Internal system formats for this DBMS |
| Sales_Type_CD | 2 characters | Sale type code A = air, H = Hotel |
| Store_FL | 1 character | Y or N to store this data in the database |
| Table_Affected_CD | 2 characters | I.E. Host Format LF would go to Saving Table |

*FIG. 22*

| Name | Size | Description |
| --- | --- | --- |
| Account_ID | orgid | Org ID Traveler ID that sale amount will be posted to accounting |
| Sales_Type_CD | 2 characters | Sale Type Code A = Air, T = Train, C = Car |
| COA_AR | 10 characters | Chart of Account for A/R |
| COA_AP | 10 characters | Chart of Account for A/P |
| COA_Commission | 10 characters | Chart of Account for Commission |
| COA_Gross_Sale | 10 characters | Chart of Account for Gross Sale |
| COA_Gross_Contra | 10 characters | Chart of Account for Gross Sale Contra |
| COA_Other | 10 characters | Chart of Account for Other |

*FIG. 23*

| Name | Size | Description |
| --- | --- | --- |
| Mssg_ID | smallint | Internam message ID number |
| Mssg_Recd | datetime | Date time message was received |
| Level | tinyint | Message priority level |
| Message | Varchar (255) | Message text |

*FIG. 24*

| Name | Size | Description |
| --- | --- | --- |
| Vendor_ID | Vid | |
| Code | 3 characters | Letter code for company AA = American Airlines |
| Description | 50 characters | Long Name |
| Type | 2 characters | Vendor class C = Car, A = Airline, H = Hotel |

*FIG. 25*

| Name | Size | Description |
|---|---|---|
| Sales_Type_CD | 2 characters | Type of sale A = Air, T = Train |
| Property_ID | 11 characters | Individual vendor property code |
| Property_Name | 30 characters | Name of property (Hotel) |
| Phone | 16 characters | Vendor phone number |
| Add_Ln2 | 25 varcharacters | Line 1 of Address 3 |
| Add_Ln2 | 25 varcharacters | Line 2 of Address 3 |
| Add_City | 25 varcharacters | Address 3 City |
| Add_Region | 3 characters | Address 3 State |
| Add_Country | 12 varcharacters | Address 3 Country |
| Add_PostCode | 9 varcharacters | Address 3 Postal Code |

*FIG. 26*

PRE- AND POST-TICKETED TRAVEL RESERVATION INFORMATION MANAGEMENT SYSTEM

This application is a continuation Ser. No. 08/317,860 filed Oct. 4, 1994 now abandoned.

STATEMENT OF FIELD OF THE INVENTION

This invention relates generally to the field of computerized travel reservation information management systems and, more particularly to such a system for providing access to current pre-ticketed and pre-invoice reservation information as well as post-ticketed reservation information.

DESCRIPTION OF THE RELEVANT PRIOR ART

The travel industry has become highly competitive, characterized by airline deregulation and over capacity. This situation has generated many fare wars including significant discounts for services purchased in advance and discount rates for the advanced booking of travel package including airfare, hotel, and ground transportation. The incentives encourage travelers to book travel plans well in advance of their departure dates through their travel agents.

Most travel reservation systems include software that allows a travel agent to access a computerized reservation system ("CRS") which provides information on the availability of commercial airline flights, ground transportation, and lodging and allows the agent to book reservations from the CRS. The reservations are maintained in most CRSs until after the travel is complete.

Typically, when the reservation is made, the travel agent enters all relevant information regarding the travel plan including the traveler's name, designation, departure date, arrival date, type of ticket being purchased (i.e., non-refundable, non-transferrable, etc.), method of payment, and ticketing date. To expedite this process, most CRSs have much of this information stored in a customer profile so that the travel agent will not have to re-enter any common information each time a reservation is made. This information is stored in a passenger name record ("PNR"). The standard practice in the travel industry is to make this travel reservation information available for analysis once the airline ticket has been issued. For example, travel information accounting systems, such as System One MAX (developed by the assignee of this invention), have been developed to download information from the CRS into a local database after a ticket has been issued so that the information can be analyzed for accounting purposes.

Most of the existing travel information accounting systems only deal with post-ticketed data. However, with the increasing emphasis on reducing travel costs, the need for access to pre-ticketed and pre-invoice data for analysis has arisen. For example, a corporation may monitor reservations made by their employees to prevent excess travel. Also, pre-ticketed data can be monitored to determine the number of people going to the same destination so that a possible group rate may be negotiated by the travel agent.

The term "pre-ticketed" is defined to refer to the time before an airline ticket is issued and the term "pre-invoice" refers to the time before an invoice is issued on, for example a rental car or hotel reservation. However, the travel industry generally refers to both pre-ticketed and pre-invoice information as pre-ticketed information. All references to pre-ticketed information hereafter will include both pre-ticketed and pre-invoice information.

U.S. Pat. No. 5,253,166, ("'166 patent") entitled "Pre-Ticket Travel Reservation Record Keeping System," discloses a system capable of retrieving and organizing pre-travel data for analysis. Each CRS offers the ability to place PNRs in a holding queue for manipulation of travel data pertaining to travelers serviced by the system. PNRs within the queue are updated as if they are modified by the travel agent. Once a day the information in the queue is read and reconfigured for use in conjunction with a relational database software, which places the data in appropriate tables in a local database. The data in the tables can then be analyzed and reports can be generated.

However, there are problems and limitations associated with this system. First, the data is not represented in the local database in a real-time manner, which causes inaccuracy in any report generated. For example, if the database is updated daily, any changes in the information made in the CRS queue after the update would not be included in any analysis performed on the information present in the database. Second, the PNR information from the CRS queue is downloaded directly into the record keeping system for modification prior to being entered into the local database. The PNR must be parsed or processed to be placed in the appropriate database format. This process is a very time intensive process and is, thus, inefficient. Third, the system described in the patent does not address the problem of reservations that are stored in the database that are subsequently modified in the CRS system. If a reservation is modified or deleted in the CRS system, a travel agent must manually alter the information in the local database.

The PDQ (Pretravel Data Query) system, marketed by Competitive Technologies, Inc. of Houston, Tex., also allows for access to pre-ticketed data. This system is very similar to that described in the '166 patent and, thus, has many of the same problems associated with it. For example, both systems utilize "batch" processing in that they are premised on dumping the PNRs from the CRS queue into a local database after a predetermined period of time. This system differs from the system disclosed in the '166 patent in that reservations that are stored in the local database and that are subsequently modified at the CRS system are replaced by the modified reservation record. The pre-ticketed data is also deleted every two days. Therefore, there is no ability to access post-ticketed data on this system.

Neither of the systems mentioned above maintain the travel information stored in the database after a ticket is issued, because both of these systems are only dedicated to tracking reservations. Thus, neither system provides a mechanism for analyzing post-ticketed and post-travel information.

Another problem associated with the prior art systems is that changes made to the customer profile in the CRS are not reflected in the local database. Typically, a travel agent will keep a customer profile locally, so that reports or mailing labels can be generated from the customer profiles without having to access the CRS. The only way to reflect changes made to the customer profile in the CRS in the local database is to enter the changes manually.

The data processing of both of the systems mentioned above is inhibited by the method of organizing and accessing the pre-ticketed data stored in the databases, which is stored in a relational database configuration, wherein specific groups are arranged into tables. Each table includes rows and columns. A row is called a record. A column (generally referred to as a "field") in a table contains one specific item of information about the record.

The database of the system described in the '166 patent is organized into a single table format, wherein all the data is stored in the same table in a sequential manner. An example of a single table format configured in accordance with the '166 patent is shown in Table 1 below.

TABLE 1

| TABLE | 1 | 2 | 3 |
|---|---|---|---|
| BEGIN RESERVATION | PNR # | | ... |
| CUSTOMER DATA | PNR # | | ... |
| TRAVEL DATA CODE | PNR # | TRAVEL CODE | ... |
| DEPARTMENT AUTHORIZATION | PNR # | DEPT. NO. | ... |
| TRANSPORTATION RENTAL | PNR # | CARCOMP | ... |
| HOTEL BOOKING DATA | PNR # | HOTCOMP | ... |
| AIR TRAVEL RESERVATION DATA | PNR # | TAIRCODE | ... |
| END RECORD | PNR # | RECORD | ... |

Reservation information associated with a single PNR number is stored in several records between two records designating the beginning and the end of the reservation information. The record fields are not identified with a specific type of data and vary depending on the type of record. Therefore, if information stored in a certain field is to be accessed, then the entire table must be accessed before a field in the table is accessed.

There are other travel reservation systems which organize information in a database in a travel transaction table format, including for example, an Air table, Ground Transportation table, and Hotel table as shown in Tables 2A, 2B and 2C below.

TABLE 2A

| AIR TABLE | | | | | |
|---|---|---|---|---|---|
| 1 | 2 | 3 | 4 | 5 | 6 |
| PNR # | CUSTOMER INFO | TRAVEL DATES | FLIGHT COST | SEAT ASSIGNMENT | ... |

TABLE 2B

| CAR TABLE | | | | | |
|---|---|---|---|---|---|
| 1 | 2 | 3 | 4 | 5 | 6 |
| PNR # | CUSTOMER INFO | TRAVEL DATES | CAR RENTAL COST | DROP INFO | ... |

TABLE 2C

| HOTEL TABLE | | | | | |
|---|---|---|---|---|---|
| 1 | 2 | 3 | 4 | 5 | 5 |
| PNR # | CUSTOMER INFO | TRAVEL DATES | HOTEL COST | ROOM TYPE | ... |

Therefore, each time reservation information associated with a PNR is accessed, many different tables must be accessed and temporarily stored in system memory slowing the processing speed of the system and increasing the need for available memory space. For example, in order to identify the total cost associated with a reservation associated with a specific PNR number, all three tables shown above would have to be accessed. Since much of the information stored in each table is the same, that is, customer information and travel dates, there is much duplicitous information that must be stored in order to retrieve the necessary information. There is also much unnecessary information specific to the travel transaction that must be accessed and stored in memory, such as seating assignment on the air carrier, rental car drop off information, and hotel room type.

These database structures are inherently difficult to modify. For example, each time a table is modified to include additional information, the software used to download and access information in the table must be must be rewritten to handle the modification to the table. If the database is arranged in the format different from that shown in Tables 2A–2C, then new software would have to be developed for each table.

These database structures also limit the type of information that can be accessed for a given display format. For example, there is a need to analyze all aspects of information effecting a trip and to create a trip plan, including saving remarks, types of money transactions, taxes, or fees for a trip. The travel reservation system problems described above contribute the inability to efficiently develop a trip plan.

The need to analyze information is accompanied by the need to customize the analysis process. For example, an agent may want to identify and analyze the travel information on all customer from a particular region. If the original database structure does not include a region field, then the agent will have to access the information based on the address of the customer. Therefore, an agent using the travel reservation systems above must modify the database and rewrite the access and download programs to accommodate the customization.

The travel reservation systems mentioned above also do not have the capability of displaying organizational information in tree-structure format with an unlimited number of nodes.

SUMMARY OF THE INVENTION

A new method for automatically generating pre-ticketed booked travel reservation information for at least one traveler has been developed to overcome the deficiencies of the prior art. In the preferred embodiment of this invention, an operator, typically a travel agent, enters a locally operated computer system. Traveler identification information is acquired for each traveler. The traveler identification information, which includes name, address, and billing information, is acquired from the traveler, from an existing customer profile stored in the locally operated computer system, or from an existing customer profile stored at a computer reservation system (CRS), the system from which the booked travel reservation information is received. An existing customer profile is maintained with traveler identification information so that identical information does not have to be reentered.

Then the CRS is accessed from the locally operated computer system. A passenger name record (PNR) is created in the CRS for each traveler, into which the traveler identification information is inserted. The CRS generates at least one potential travel itinerary for each traveler, at least one of which is subsequently selected and booked. Information regarding the booked travel itinerary reservation is placed in the PNR. Information in the PNR is then automatically transferred to the locally operated computer system when the reservation is booked.

If a ticket is not generated simultaneously, then the information transferred to the locally operated computer system is pre-ticketed booked travel reservation information that can be displayed on the computer, used to generate reports from the computer, downloaded in a database for processing, or combined with previously stored post-ticketed information to generate reports including both types of information.

In an alternate method of automatically generating pre-ticketed booked travel reservation information for at least one traveler, the steps of entering a locally operated computer system, acquiring traveler identification information for each traveler, accessing a computer reservation system (CRS) from the locally operated computer system, creating a passenger name record (PNR) in the CRS for each traveler, and inserting the traveler identification information into the PNR, are combined with the steps of generating, in the CRS, at least one potential travel itinerary, including at least one travel transaction, for each traveler, selecting at least one travel itinerary for booking, booking a reservation in the CRS for each selected travel itinerary, placing information regarding the booked travel itinerary reservation in the PNR, creating an information management record (IMR) in the CRS automatically when the reservation is booked, including the information from the PNR, and transferring the IMR to the locally operated computer system.

In order to select information from the PNR to be placed in the IMR and transferred to the locally operated computer system, the PNR can be parsed.

The information in the IMR can be formatted in the CRS into a format compatible with the locally operated computer prior to transferring the IMR to the locally operated computer system. For example, the formatting step for at least two travel transactions included in the booked travel itinerary reservation information, comprises the steps of identifying characteristics common to all travel transactions, storing the identified common characteristics in a common table, identifying characteristics in each travel transaction that are not common to the other travel transactions, storing the uncommon characteristics in a detail table corresponding to each travel transaction, and linking all detail tables to the common table by a linking field. The common table can represent sales information that is common to all travel transactions.

The information stored in the tables can be stored in a locally operated computer system and displayed on the locally operated computer system or printed in a report from the locally operated computer system. If the information is not stored in a table in the locally operated computer system, it can be retrieved and displayed and printed in a report from the locally operated computer system. This information can also be combined with previously stored post-ticketed information to generates reports including both types of information.

Either of the methods described above for automatically generating pre-ticketed booked travel reservation information for at least one traveler can be combined with a method for automatically updating an existing customer profile stored in more than one computer of a system having many locally operated computer systems, when at least one of the customer profiles is updated. The method includes the steps of accessing an existing customer profile corresponding to each traveler stored in the locally operated computer system, updating the customer profile with any new traveler identification information, transferring the updated customer profile to the CRS when requesting the access to the CRS, accessing an existing customer profile corresponding to each traveler stored in the CRS, updating each CRS customer profile with the new traveler identification information, selecting other locally operated computer systems that have an existing customer profile corresponding to each traveler that requires updating, preparing an electronic message indicating that the CRS customer profile was updated, transmitting the electronic message to the selected locally operated computer systems, receiving the electronic message at the selected locally operated computer systems, accessing the CRS updated customer profile information, and updating the corresponding customer profile in the selected locally operated computer system. The CRS updated customer profile information can be accessed from either the CRS or from the electronic message.

The booked travel reservation information from the IMR can be stored in the database for subsequent processing.

In another embodiment of this invention is a method of storing booked travel itinerary reservation information, including at least two travel transactions, generated by a computer reservation system (CRS) for subsequent processing in a locally operated computer system. The method includes the steps of accessing the booked travel itinerary reservation information from the CRS, identifying characteristics common to all the travel transactions, storing the common characteristics in a common table in the locally operated computer system, identifying characteristics in each travel transaction that are not common to the other travel transactions, storing the uncommon characteristics in respective detail tables corresponding to each travel transaction in the locally operated computer, and linking the detail tables to the common table by a linking field.

The common table can represent sales information that is common to all travel transactions.

A typical itinerary can include three travel transactions, such as an air transaction, a hotel transaction, and a rental car transaction. In this example, the common table represents sales information that is common to all three travel transactions. The characteristics of the air transaction, the hotel transaction, and the rental car transaction that are not common sales information are stored in an air table, hotel table, and car table, respectively. There can be other types of travel transactions such as a rail transaction and a cruise transaction with other type of tables, such as a rail table and cruise table.

Regardless of what type of information is stored in the tables, it may be accessed and displayed on the locally operated computer system or printed in at least one report including the booked travel itinerary reservation information from the locally operated computer system.

The travel reservation information from the CRS is accessed directly from the CRS or may be accessed from an interim storage facility.

In the alternative, the tables described above may be stored in the CRS, rather than being generated and stored in the locally operated computer system. The method of generating the tables in the CRS includes the steps of accessing the booked travel itinerary reservation information from the CRS, identify characteristics common to all the travel transactions, storing the common characteristics in a common table in the CRS, identifying characteristics in each travel transaction that are not common to the other travel transactions, storing the uncommon characteristics in respective detail tables corresponding to each travel transaction in the CRS, and linking the detail tables to the common table by a linking field. The tables can be transferred from the CRS to a locally operated computer system and stored in the locally operated computer system.

Once the tables including the booked travel reservation information are sent to the locally operated computer system in either of the embodiments above, they can be stored in a database.

In yet another alternate embodiment of this invention is a method of automatically updating an existing customer profile for at least one traveler in any locally operated computer system with new traveler identification information that was input into a corresponding customer profile in a computerized reservation system (CRS). The method includes the steps of accessing the CRS, accessing the existing customer profile corresponding to each traveler in the CRS, updating the CRS customer profile with the new traveler identification information, selecting locally operated computer systems that have a customer profile corresponding to each traveler that requires updating, preparing an electronic message indicating that the CRS customer profile was updated, transmitting the electronic message to the selected locally operated computer systems, receiving the electronic message at the selected locally operated computer systems, accessing the new traveler identification information updated in the CRS customer profile, and updating the corresponding customer profile in the selected locally operated computer system with the new travel identification information.

The locally operated computer system can access the new traveler identification information from the CRS or from the electronic message.

Also disclosed is a system for automatically generating pre-ticketed travel information for a traveler once a reservation is booked for subsequent analysis. The system includes a locally operated computer system with a database therein, a computerized reservation system (CRS) that generates travel itineraries, books reservations for selected travel transactions, and generates reservation information that is accessed by the locally operated computer system through communication means, means connected to the CRS for detecting the booking of a reservation, and means for automatically transferring traveler and reservation information to the locally operated computer system through the communication means for downloading into the database. The communication means could include but are not limited to a communication modem and phone lines.

BRIEF DESCRIPTION OF THE DRAWINGS

In the Drawings:

FIG. 3 is an illustration of the form of raw data available in a PNR generated by a typical CRS system.

FIG. 4 is an illustration of a representation of data items selected from the PNR shown in FIG. 3 in accordance with the preferred embodiment of this invention.

FIG. 6 is an illustration of selected records of the Sales table shown in FIG. 5.

FIG. 7 is an illustration of selected records of the Trip Plan table shown in FIG. 5.

FIG. 8 is an illustration of selected records of the Hotel detail table shown in FIG. 5.

FIG. 9 is an illustration of selected records of the Segments detail table shown in FIG. 5.

FIG. 10 is an illustration of selected records of the Car detail table shown in FIG. 5.

FIG. 11 is an illustration of selected records of the Miscellaneous detail table shown in FIG. 5.

FIG. 12 is an illustration of selected records of the Taxes and Fee detail table shown in FIG. 5.

FIG. 13 is an illustration of selected records of the Commission detail table shown in FIG. 5.

FIG. 14 is an illustration of selected records of the Money Transaction detail table shown in FIG. 5.

FIG. 15 is an illustration of selected records of the Revenue Sharing detail table shown in FIG. 5.

FIG. 16 is an illustration of selected records of the Organization detail table shown in FIG. 5.

FIGS. 17a and 17b are illustrations of selected records of the Traveler detail table shown in FIG. 5.

FIG. 18 is an illustration of selected records of the Organization/Traveler detail table shown in FIG. 5.

FIG. 19 is an illustration of selected records of the Sales Remarks detail table shown in FIG. 5.

FIG. 20 is an illustration of selected records of the Savings Remarks detail table shown in FIG. 5.

FIG. 21 is an illustration of selected records of the User Defined Remarks detail table shown in FIG. 5.

FIG. 22 is an illustration of selected records of the Interface Remarks detail table shown in FIG. 5.

FIG. 23 is an illustration of selected records of the Chart of Accounts detail table shown in FIG. 5.

FIG. 24 is an illustration of selected records of the Message Log detail table shown in FIG. 5.

FIG. 25 is an illustration of selected records of the Vendor detail table shown in FIG. 5.

FIG. 26 is an illustration of selected records of the Vendor Address detail table shown in FIG. 5.

DESCRIPTION OF THE PREFERRED EMBODIMENT

Figure 1:
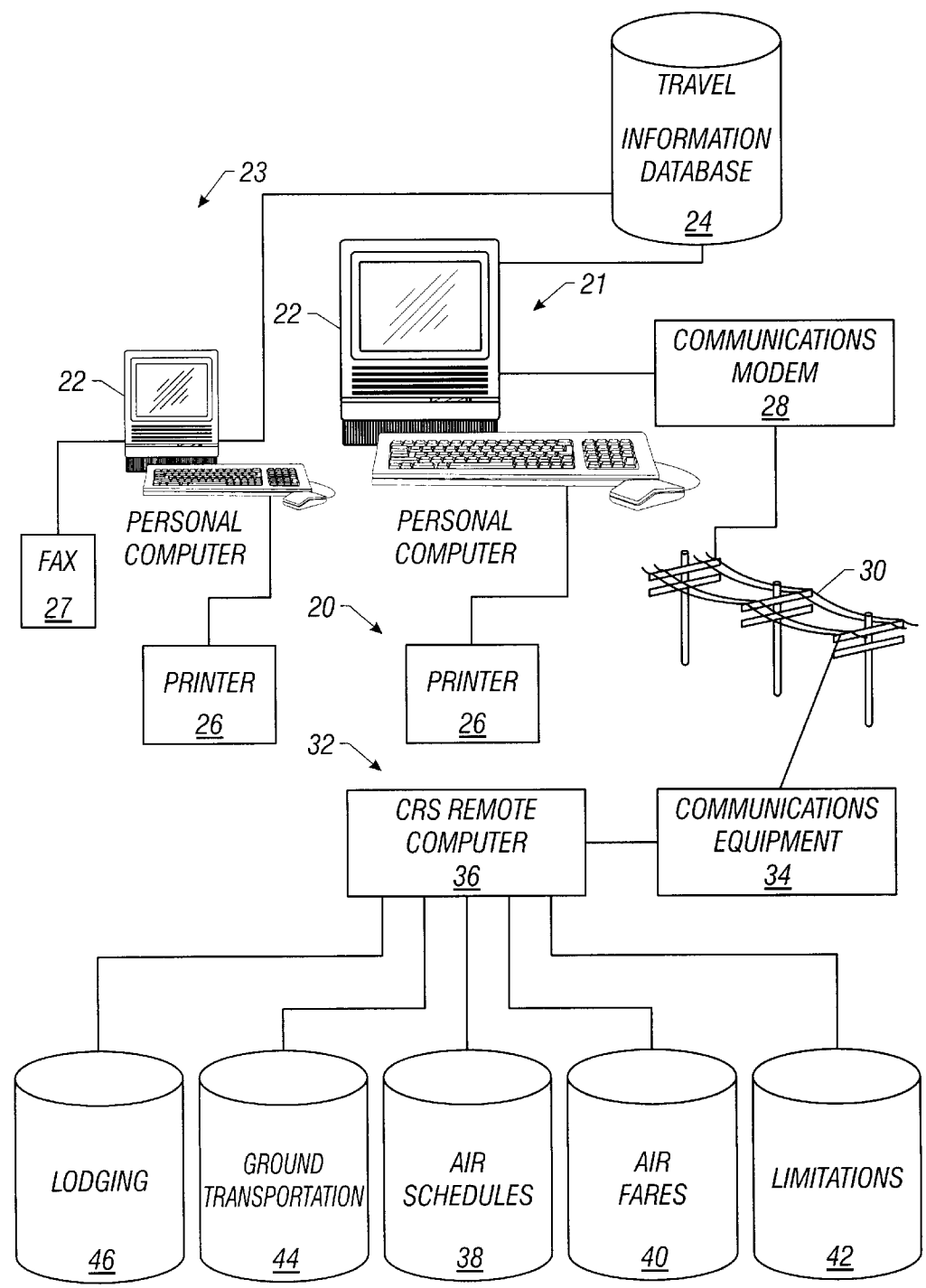
FIG. 1 is a schematic view of a system in accordance with the present invention.

Referring to the drawings, in FIG. 1 systems for accessing and processing pre- and post-ticketed travel reservation data 20 includes a travel agency's locally operated computer systems 21 and 23 having terminals 22, memory storage disks 24 for storing pre- and post-ticketed travel information, printers 26, communications modems 28, and any other peripheral devices such as facsimile machine 27. Modem 28 is connected via land lines 30 to a remotely maintained computer system 32. However, any type of communications equipment could be used between the locally operated computer system and the CRS. The computer system 32 includes communication interface equipment 34, computer 36, and a plurality of memory storage disks 38, 40, 42, 44, and 46.

The remote computer system is a computer reservation system ("CRS") such as the System One CRS, provided by Assignee of the present invention. The remote computer includes a large mainframe, capable of processing significantly large amounts of data.

Figure 2A:
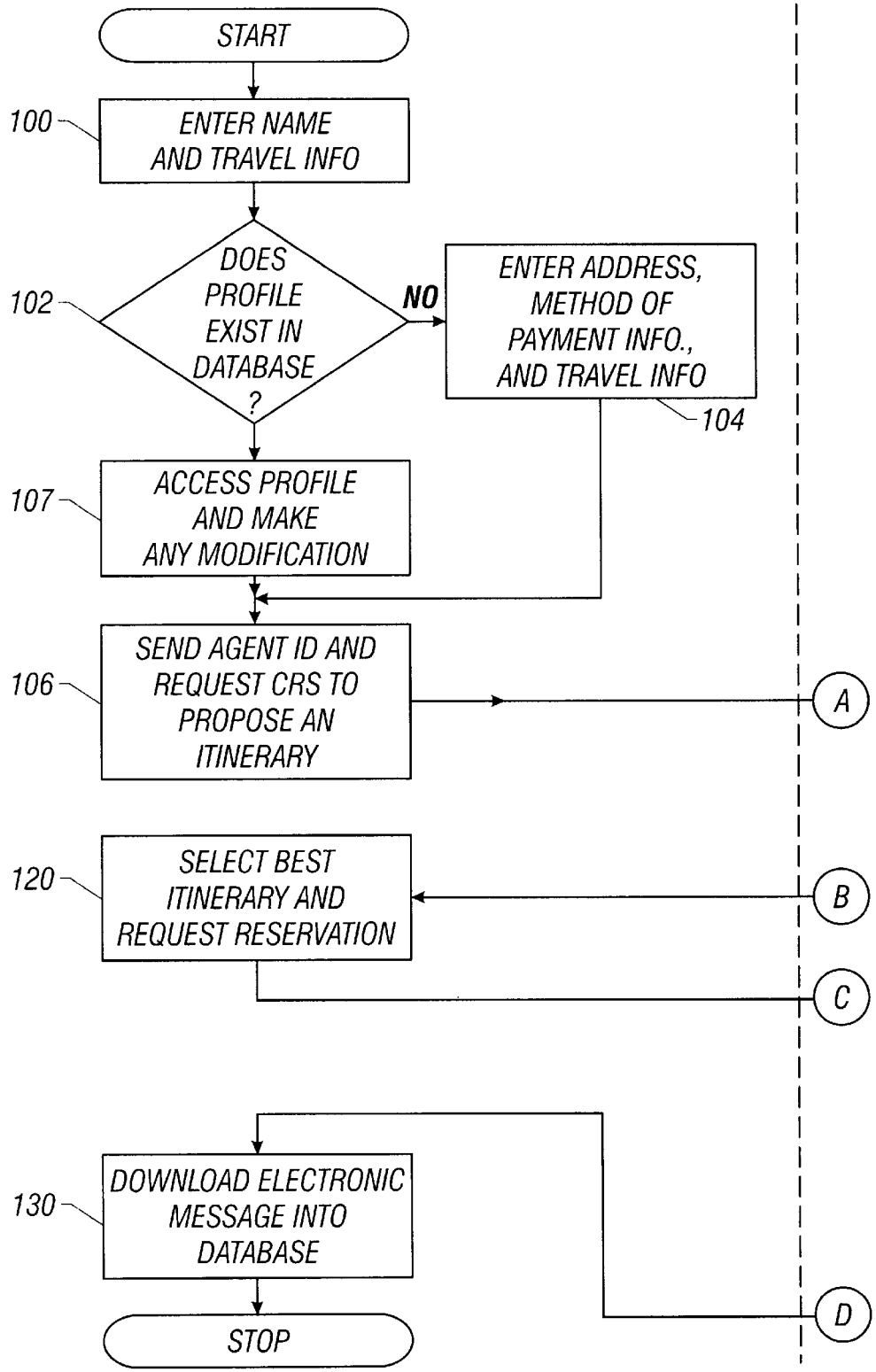
FIG. 2 is a logical flow diagram showing the overall operation of the present invention.
Figure 2B:
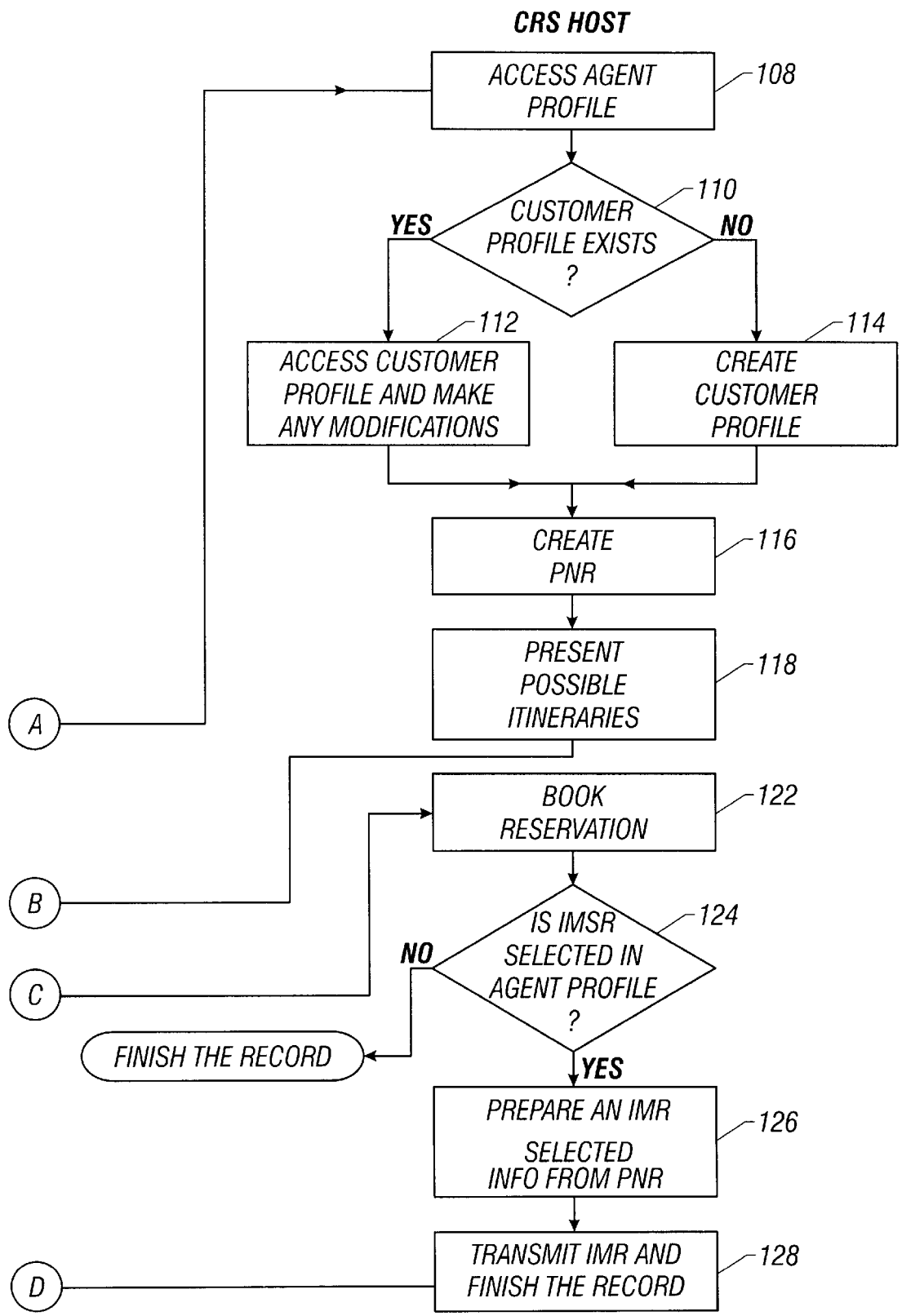

FIG. 2 shows the process for automatically updating the local travel information database 24 every time a PNR is created or modified in the CRS in its broadest sense depicted in flowchart form. The process is essentially performed by software executed in two locations. The first part of the software is installed on a travel agent's locally operated computer system and the second part is installed on the remote CRS host computer. The two portions of the software communicate with each other to execute a request for a proposed itinerary, book a reservation for a traveler, and automatically store that information in a travel information database 24.

When making a reservation for a traveler, the travel agent enters the traveler's name and travel information, step 100. The system automatically determines if the traveler is a first-time customer, step 102. If the traveler is a first-time customer, then the agent enters traveler identification information about the customer, step 104, including the address, method of payment and any special travel requirements and the desired travel information. Then the agent requests access to the CRS host to obtain itineraries, step 106. If a profile does exists, then it is accessed and modified if necessary, step 107, before accessing the CRS.

Each locally operated computer system that is configured for connection to CRS remote computer system 36 is assigned an agency identification number ("ID"). An agency profile corresponding to the agency ID, is stored at the CRS host. The profile contains all relevant information regarding the agency, including data paths and security access codes. One specific type of information available pertaining to this invention is whether or not the agency requested that an information management record ("IMR") be generated automatically every time a reservation is booked. An IMR is a record temporarily generated by the CRS, including both traveler identification information and booked travel itinerary reservation information, which will be transmitted to the agency. (A more detailed explanation of the IMR will be provided further on in this description.) Thus, when the agency requests access to the CRS host, the agency ID is automatically sent to the CRS host to identify the locally operated computer system requesting access, step 106.

Once the CRS host accesses the agency profile pursuant to the agent ID, step 108, the CRS checks whether a customer profile exists, step 110. If a profile exists, then the computer accesses the profile and makes any necessary modifications, step 112. If a profile does not exist, then the CRS host computer creates one, step 114. Then the CRS host creates a PNR record, step 116, and develops possible itineraries, step 118, for presentation to the agent. The agent then selects the best itinerary and requests a reservation, step 120. Upon receipt of the reservation request, the CRS host then books the reservation, step 122. If the I.M.R record option is selected, then the CRS host immediately prepares an IMR for sending to the agency terminal. Otherwise, the CRS host finishes the record, step 124.

In order to prepare an IMR, the CRS host parses the PNR created by the CRS, such as that shown in FIG. 3, step 126. The host selects which information from the PNR is necessary and reformats the data for transmission to the locally operated computer system. The PNR could be directly downloaded to the locally operated computer system. However, it is much more efficient to format the data in the host in such a way as to facilitate the downloading of the data at the locally operated computer system travel information database. The parsing of the PNR is performed prior to downloading the data into a database, because it is more efficient to perform this process at the CRS host than at the locally operated computer system.

Once the IMR is created, the host transmits it to the locally operated computer system and finishes the record, step 128. When the terminal receives the IMR the data is immediately converted and downloaded into the local travel information database, step 130. The following IMR structure is used. However, it is well known to those skilled in the art that any information selected from the PNR could be arranged in any number of ways. Also, it is well known that the information could be stored in any storage medium rather than a database.

In the preferred embodiment of this invention, the information from the PNR is stored in the IMR in a number of predetermined fields, each represented by a specific letter. The specific letters and the associated characteristics of the preferred embodiment are as follows:

Header 1—Message tag and ticketing option and version number.

Header 2—Reserved for Accounting Interface Record (AIR)

Header 3—LNIATA of transmitting terminal.

Header 4—CRS ID, PNR record locator, ARC number and Account ID.

Line A—The cost factor is provided if SATO (Scheduled Airline Traffic Office) is specified. The ticketing airline and the alpha and numeric codes of the airline are not provided.

Line B—The ticketing entry as it appears on the PNR at the time of receipt the ET (end transaction) instruction and the P21 entry followed by any ticketing entry present in the ticketing field at the time of P21. (An IMR is created by the external P21 entry submitted by an agent.) The line is blank for all internal creations of the IMR. An ATB (Automated Ticket Boarding Pass) and the Boarding Pass Only indicators are not provided since a ticket or boarding pass are not issued. The ticketing time arrangement data from the PNR is also provided.

Line C—The codes for ticketing indicator and servicing carrier and the booking agent are provided.

Line D—The PNR creation date, PNR last changed date, and IMR creation date are provided.

Line E—Forms of payment are provided, including a credit card number and the 4-digit bank number, cash, or check. The form of payment appears in the IMR as it appears in the PNR.

Line F—Custom generated endorsements are provided.

Line FF—AMTRAK generated endorsements are provided (the term "AMTRAK" generally refers to "railway").

Line G—The tax, international "X" indicator, and self sale "S" indicator, and sales indicator are provided.

Line H—All ticketed and unticketed segments are provided for each IMR creation. The type of segments appearing in this line are FLIGHT, AMTRAK and AUXILIARY. All information regarding hotels and ground transportation is provided in Line H.

Line I—This line contains the passenger name, the passenger type, the passenger ID number and phone number.

Line S—This line contains all seats requested and boarding passes issued.

Line J—This line contains all frequent traveler information that the customer has listed in the PNR.

Line K—This line contains the base fare, the equivalent amount, taxes, currency type, equivalent currency type, and total of an airline ticket without a ticket being issued.

Line KK—This line contains the base fare, the equivalent amount, taxes, currency type, equivalent currency type, and total of an AMTRAK ticket without a ticket being issued.

Line L—This line contains the taxes and any relevant PFCs for airline tickets without a ticket being issued.

Line M—This line contains the fare basis codes for airline tickets without a ticket being issued.

Line MM—This line contains the fare basis codes for AMTRAK tickets without a ticket being issued.

Line N—This line contains the individual segment fares airline tickets without a ticket being issued. The N-line does not contain any international fare data.

Line NN—This line contains the individual segment fares for AMTRAK tickets without a ticket being issued. The N-line does not contain any international fare data.

Line O—This line contains the not valid before and after dates for airline tickets without a ticket being issued.

Line OO—This line contains the not valid before and after dates for AMTRAK tickets without a ticket being issued.

Line Q—The Q-line is provided for each passenger, with priceable air segments. This line contains the fare calculation data for airline tickets without a ticket being issued.

Line QQ—The QQ-line is provided for each passenger, with priceable air segments. This line contains the fare calculation data for AMTRAK tickets without a ticket being issued.

Any remarks beginning with "5*aa" are to be processed at the end of the IMR record. The "aa" term equates to two alphanumerics.

Lines I–OO are provided for each passenger.

FIG. 4 shows an example of an IMR developed from a PNR of a passenger flying to Newark. However, each IMR will vary depending on the travel information. If the traveler does not travel by AMTRAK, then the lines associated with AMTRAK will not exist.

In this embodiment of the invention, the information from the IMR is then downloaded into the local travel information database. The information can be loaded into any database utilizing any database management systems, such as relational database management systems SQL Server or Access both distributed by MicroSoft or SQL Base distributed by GUPTA. In the preferred embodiment of this invention, the SQL Server is used for larger data processing requirements and the Access package is used for smaller data processing requirements.

In the alternative, the IMR could be loaded into any storage medium, which can be accessed for subsequent processing of the data in the IMR.

Even though relational databases are being used, the travel information data is being stored in a unique format to facilitate report generation, making data processing much more efficient. Instead of configuring the database to track reservations like the prior art database, the database of the present invention is designed to track sales.

Figure 5:
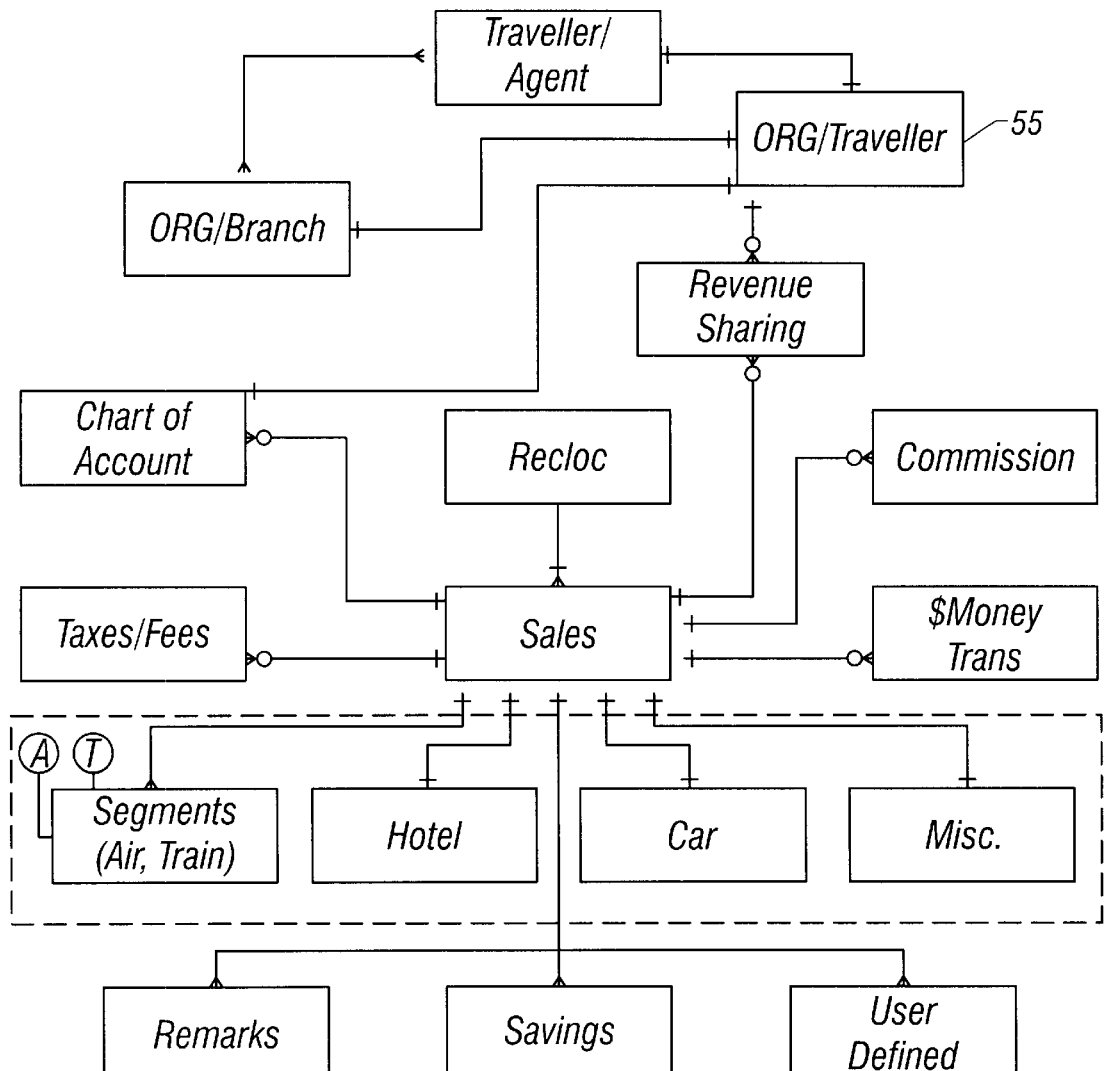
FIG. 5 is a schematic view of the local database structure of the present invention.

In order to implement this sales tracking process, the tables in the database are arranged in an object-oriented configuration such as that shown in FIG. 5. The history and specifics of object-oriented databases are well known to those of ordinary skill in the art and are described in a book entitled "Database Design Fundamentals;" written by Naphtali Rishe; and published by Prentice Hall in 1988. Each box on the diagram shown in FIG. 5 represents a table in a relational database, most of which are linked by common fields.

The theory behind this organization is that all travel transactions made during the booking of a single travel reservation, such as an air transaction, a car rental transaction, and a hotel transaction, are fundamentally sales. Therefore, all the sales characteristics common to each of the travel transactions are pulled out and put in a Sales table. An example of this information is shown in FIG. 6. The fields of a record in the table are listed in the descending order with the size of the field and the description listed next to the field.

Therefore, in object-oriented terminology, the Sales table represents a class. The other boxes on the FIG. 5 diagram, except for the "Recloc" box, are considered subclasses, in that the characteristics of the specific transaction that are not common with other transactions and are included in a separate table, such as those shown in FIGS. 8–21. Therefore, there are at least fifteen tables in the database all linked by a common field.

The structure of the database is designed to provide the ability to display or analyze a trip plan so that trip information can be viewed together at a summary level or separately in detail. For example, if there are many travelers on the same trip plan, the individual trip information can be viewed in the same trip plan or individually.

FIG. 7 shows the Trip Plan table associated with the "Recloc" box, the record locator box. The Trip Plan is considered a superclass. When the host creates an IMR and transmits it to the locally operated computer system, the database creates a trip plan, wherein a unique transaction identification number is generated and placed in the TRAN_ID fields of all appropriate tables. The TRAN_ID is the one field common to all tables in the database that receive information from the IMR and is, thus, the linking field.

There are some tables that do not include the TRAN_ID field, including the Revenue Sharing, Organization, Traveler, Organization/Traveler, Interface Remarks, Chart of Accounts, Vendor, Vendor Address, and the Massage Log tables. These tables typically store information that will be maintained by the user, each of which will be discussed in more detail later on in this description.

The main body of an itinerary is found in the Sales table, which contains the information for pre- and post-ticketed records. Specifically, all the common sales information regarding the air, train, car, and miscellaneous segments is stored in a common table, the Sales table. Any detailed information pertaining to the specific travel transaction or sale will be located in a corresponding detail table, subclass table. For example, hotel, car, and miscellaneous detail information is housed in the Hotel (FIG. 8), Car (FIG. 10), and Miscellaneous (FIG. 11) tables, respectively. Train and Air information is stored in the Segments table (FIG. 9). Typically, there is a relationship of one row in the Sales table to one row in the detail table. Thus, each row in the detail table consists of one sales item. This does not apply to the Segments table, where there could be many segments for one air or train sale and, thus, many entries in the table for a single reservation.

The database assigns an unique identification number to each different type of transaction. For example, a sales identification number is assigned for each travel transaction of a reservation, including the sales in the air, hotel, and car transactions. The identification number is then be placed in the SALE_ID fields of necessary tables. Since there may be more than one segment for an air segment, an additional index called the SEGMENT NUMBER is necessary to access a specific travel transaction.

FIG. 17 shows an example Money Transaction table which is another table that requires an additional index field. For each sale, either zero or multiple transactions could exist. A transaction can consist of money (cash, check, or credit card) payments, exchange documents (tickets, refunds, or airline reportable documents). Each row in the money transaction table is identified to be unique by numbers in the TRAN_ID, SALES_ID and PAY_ID fields. In order to access the Taxes and Fee table (FIG. 12) and Commission table (FIG. 13), a TRAN_ID number and a sequence number are required because there could be multiple taxes and fees for each sale and either zero or multiple commissions for each sale.

The relationship between the Sales table (FIG. 6) and the Revenue Sharing table (FIG. 15) is the Account_ID field.

The Account_ID is the identification number of an organization (see Organization table (FIG. 16)) or traveler (see Traveler table (FIGS. 17a and 17b)). The record or records in the Revenue Sharing table define how the commission will be shared among agents for a particular Account_ID.

Referring to FIGS. 16, 17a and 17b, the Organization and Traveler table are shown. Specifically, the Organization table is used to store agency, branch, and customer information, including organizational roll-up that would be needed or individual customer information that an agency would want to track. The Traveler table includes all information for a traveler and agent or employee of an agency or corporation. The information in these tables is maintained by the user, but could be updated automatically by importing the information from the host.

A traveler is identified as a customer or an agent. This traveler may or may not belong to an organization. An organization may be comprised of many individual travelers or other organizations. Each organization has one parent organization or none. The Organization table represents a tree-structure where the leaves are travelers or organizations. For example, in the agency environment, an ORG_ID (ARC#) is entered for the main office and each branch office. The Parent_Org_ID field houses the main branches ARC number. In order to facilitate a the display of the tree-structure with unlimited nodes, an Organization/Traveler table, such as that showing FIG. 18, is utilized.

The tables shown FIGS. 19–21, the Sales Remarks, Savings, and User Defined tables, are all considered remarks tables and are accessed through TRAN_ID, SALES_ID, and sequence number fields in the same manner that the other tables are accessed. It is the unique organization of the information in the tables that allows a User Definable Remarks table to exist, which allows for customization of reports. There are an unlimited number of User Definable tables to allow for customized report generation.

FIGS. 22–26 show examples of different types of table that can be created. FIG. 22 shows the Interface Remarks table where information regarding the interface between the CRS host and the locally operated computer system is stored. The Chart of Accounts (FIG. 23), Message Log (FIG. 24), Vendor (FIG. 25), and Vendor Address (FIG. 26) tables are maintained by the user.

The fields designated in the Sales table are not mandatory and may be comprised of any type of field representing common characteristics of a sale. It is also not necessary that all of the tables in FIGS. 8–26 be present nor is it necessary that all of the information shown be included in the tables. The number of tables and the number of fields within a table vary depending on the type of information that is desirable. For example, a user may not be concerned with which organization a traveler may be associated. Therefore, the Organization table would not be necessary.

The organization of the database in the structure described above provides a much more efficient system for updating and accessing the information in the database and for generating reports from the information in the database. If a user wants to generate a report listing the names of all travelers who were invoiced on a particular date, then only the Sales table will have to be accessed using the invoice date field. Then all customers with the common invoice date can be listed without having to go into all of the tables in the database. The person generating the report does not care if the invoice results from a hotel transaction, car transaction or an airline transaction. Thus, the information in those tables do not have to be accessed. As a consequence, report generation is much more efficiently handled.

Since an IMR is generated every time the PNR is updated at the CRS instantaneously, the information in the database is current at all times, regardless of whether a ticket or invoice has been issued. The data is also maintained in the database until it is deleted. Therefore, the reports can be generated from pre-ticketed and post-ticketed information providing a much more useful system.

Each time a reservation is modified in the CRS a new IMR is created and transmitted to the locally operated computer system. The existing information in the database associated with the old reservation is then updated via the TRAN_ID number.

The process for automatically updating the local travel information database 24 (FIG. 1) every time a PNR is created or modified in the CRS described above utilizes an IMR. However, the process could be modified by one of ordinary skill in the art to download the information directly from the PNR to the locally operated computer system upon detection of the booking of a reservation. No IMR is required.

Figure 27:
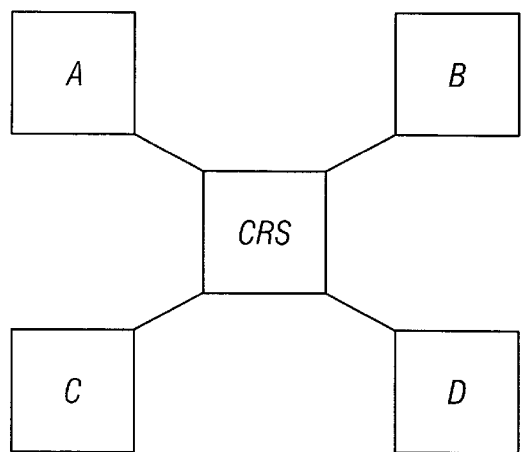
FIG. 27 is an illustration of a several branches of an agency connected to a CRS.

In an alternate embodiment of this invention, the instantaneous data transmission upon an occurrence in the CRS is applied to maintaining the customer profile data available in the CRS consistent with that in the locally operated computer system. This is necessary for the situations such as that shown in FIG. 27, where the CRS is connected to branches A, B, C, and D, which represent different branches of the same agency or different sites of a corporation. For example, if the agency profile indicates that a customer profile exists in several different local computer systems (A, B, C, and D), the CRS host will send a message to all computer systems each time the profile in the CRS host is updated.

Figure 28A:
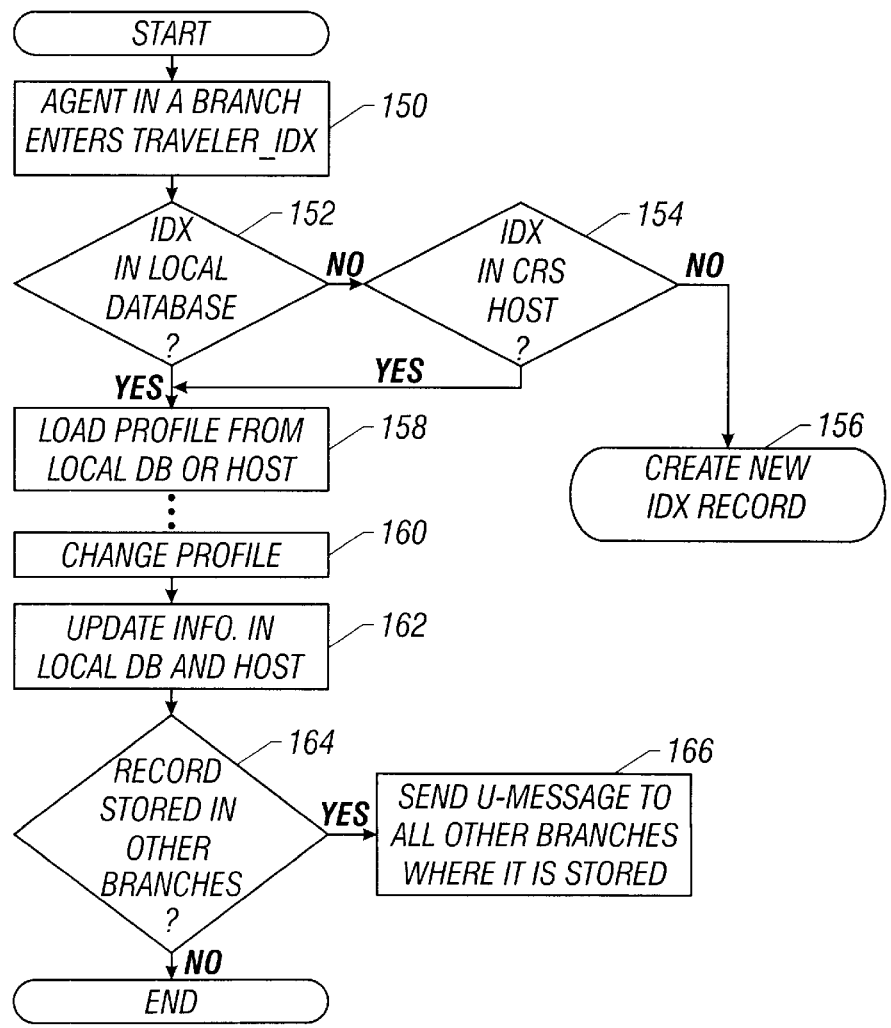
FIGS. 28a and 28b are a logical flow diagrams showing the process for automatically synchronizing the updating of a customer profile in a locally operate system and the CRS host.
Figure 28B:
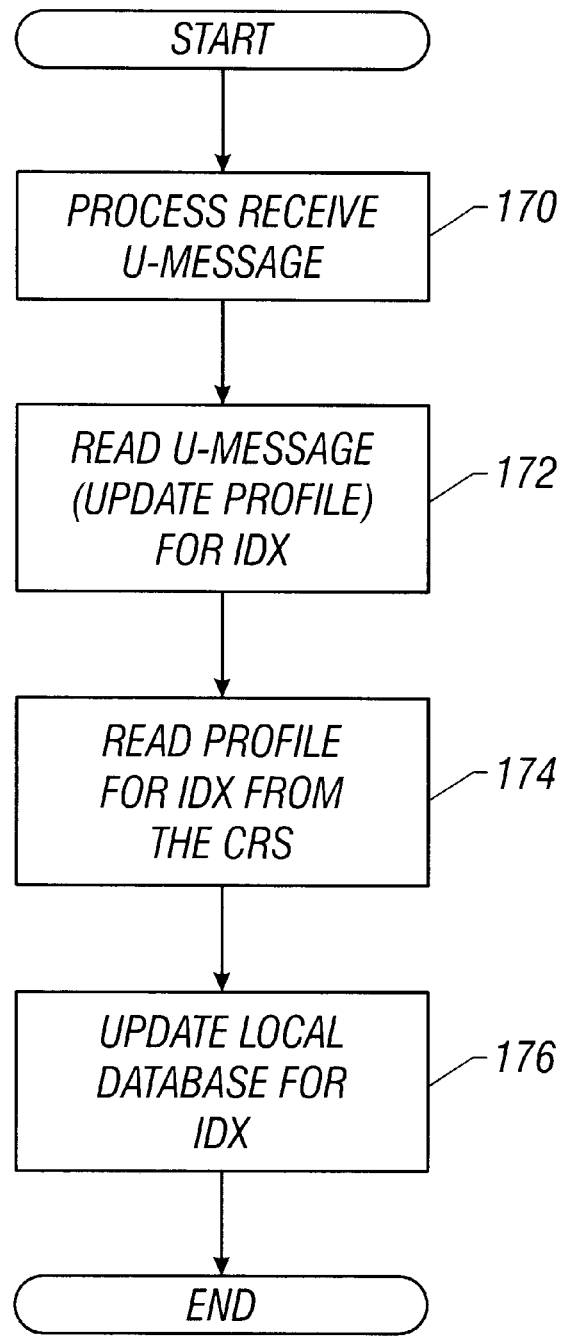

The process for updating the customer profile in the locally operated computer system of agency branch offices is shown in FIGS. 28a and 28b. An agent in a branch office enters the customers travel IDx, step 150. The system automatically checks the local database to determine if IDx exists, step 152. If IDx does not exist in the local database, then the system automatically checks the CRS host to determine if IDx exist, step 154. If it does not, then a new record is created, step 156. If the IDx exists in either the local database or in the CRS host, then the profile associated with that IDx is loaded from the local database or the CRS host, which ever is appropriate, step 158. Any changes to the profile are then made, step 160, and subsequently updated in both the local database and CRS host, step 162. The system then automatically determines whether the record is stored in other agency branches, step 164. If not, the profile update is complete. However, if the record is stored in other branches, then a u-message is sent to all the branches where the information is stored, step 166.

All branches are equipped with the system that will automatically process a u-message once it is received. FIG. 28b shows the process for receiving a u-message and updating the customer profile. Once a u-message is detected, it is received by the system, step 170, and read to determine the action required. If the u-message reads "update profile for IDx," step 172, then the locally operated computer system accesses the CRS to obtain the new information used, step 174, to update the local database with the profile for IDx, step 176.

This process could be modified to detect any change to the profile in the CRS regardless if the change was first made to the profile in the locally operated computer system.

The processing steps shown in FIGS. 28a and 28b cause updates in the customer profile in the locally operated computer systems and CRS host to be synchronized automatically, thereby eliminating the problems of having inconsistent data in the customer profiles at different agency branches or corporation sites.

It is not required that the locally operated computer system access the CRS to obtain the new information, the u-message sent from the CRS could contain the information.

The foregoing software was developed in an object-oriented configuration using a standard object-oriented language such as C++. However, it will be obvious to anyone of ordinary skill in the art that the aforementioned program may be developed in a different programming language using non-object-oriented techniques. Even though the relational database package was used, the foregoing database configuration could be implemented in an objected-oriented database by one of ordinary skill in the art. All the equipment described in the above travel reservation system is readily available.

The embodiment of the invention described above all utilize a database in the locally operated computer system. However, any type of storage means may be use for storing the data.

From the foregoing it will be seen that this invention is one well adapted to attain all of the features and objects hereinabove set forth, together with other advantages which are obvious and which are inherent to the methods and apparatuses.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

What is claimed is:

1. A method of automatically generating pre-ticketed booked travel reservation information for at least one traveler, comprising the steps of:

entering a first locally operated computer system selected from among a plurality of associated locally operated computer systems;

acquiring traveler identification information for each traveler;

accessing a computer reservation system from the first locally operated computer system;

creating a passenger name record in the computer reservation system for each traveler;

inserting the traveler identification information into the passenger name record;

generating, in the computer reservation system, at least one potential travel itinerary for each traveler;

selecting at least one travel itinerary for booking;

booking a reservation in the computer reservation system for each selected travel itinerary;

placing information regarding the booked travel itinerary reservation in the passenger name records;

automatically transferring the information in the passenger name record to the first locally operated computer system substantially immediately after the reservation is booked;

causing the computer reservation system to determine at least a second locally operated computer system, selected from among the plurality of associated locally operated computer systems, that also requires the information in the passenger name record and then automatically transferring the information in the passenger name record to the second locally operated computer system;

notifying at least the first and second locally operated computer systems when at least a portion of the information in the passenger name record is subsequently modified; and updating the information in the passenger name record within the first and second locally operated computer systems when at least a portion of the information in the passenger name record is subsequently modified.

2. The method of claim 1, wherein said traveler identification information is accessed from an existing customer profile associated with each traveler in a database in the first locally operated computer system.

3. The method of claim 1, wherein said traveler identification information is accessed from an existing customer profile corresponding to each traveler in the computer reservation system.

4. The method of claim 1, wherein said traveler identification information is accessed from each traveler and entered into the first locally operated computer system.

5. The method of claim 1, additionally comprising the step of displaying the booked travel itinerary reservation information on the first locally operated computer system.

6. The method of claim 1, additionally comprising the step of printing at least one report including the booked travel itinerary reservation information from the first locally operated computer system.

7. The method of claim 1, additionally comprising the step of:

downloading the passenger name record information that was transferred to the first locally operated computer system to a database in the first locally operated computer for subsequent processing.

8. The method of claim 1, additionally comprising the steps of:

processing the booked travel itinerary reservation information with existing post-ticketed data stored in the first locally operated computer system; and generating at least one report including both booked travel itinerary reservation information and the existing post-ticketed data.

9. A method of automatically generating pre-ticketed booked travel reservation information for at least one traveler, comprising the steps of:

entering a first locally operated computer system selected from among a plurality of associated locally operated computer systems;

acquiring traveler identification information for each traveler;

accessing a computer reservation system from the first locally operated computer system;

creating a passenger name record in the computer reservation system for each traveler;

inserting the traveler identification information into the passenger name record;

generating, in the computer reservation system, at least one potential travel itinerary, including at least one travel transaction, for each traveler;

selecting at least one travel itinerary for booking;

booking a reservation in the computer reservation system for each selected travel itinerary;

placing information regarding the booked travel itinerary reservation in the passenger name record;

creating an information management record in the computer reservation system, based on the contents of the passenger name record, automatically and substantially immediately after the reservation is booked;

automatically transferring the information management record to the first locally operated computer system substantially immediately after the information management record is created;

causing the computer reservation system to determine at least a second locally operated computer system, selected from among the plurality of associated locally operated computer systems, that also requires the information in the passenger name record and then automatically transferring the information management record to the second locally operated computer system;

notifying at least the first and second locally operated computer systems when at least a portion of the information in the passenger name record is subsequently modified; and providing an updated information management record to the first and second locally operated computer systems when at least a portion of the information in the passenger name record is subsequently modified.

10. The method of claim 9, additionally comprising the step of:

parsing the passenger name record to identify information to be placed in the information management record and transferred to the first locally operated computer system.

11. The method of claim 9, additionally comprising the step of:

formatting the information in the information management record into a format compatible with the first locally operated computer using the computer reservation system prior to transferring the information management record to the first locally operated computer system.

12. The method of claim 11, wherein the formatting step for at least two travel transactions included in the booked travel itinerary reservation information, comprises the steps of identifying characteristics common to all travel transactions, storing the identified common characteristics in a common table, identifying characteristics in each travel transaction that are not common to the other travel transactions, storing the uncommon characteristics in a detail table corresponding to each travel transaction, and linking all detail tables to the common table by a linking field.

13. The method of claim 12, wherein the common table represents sales information that is common to all travel transactions.

14. The method of claim 12, additionally comprising the steps of:

accessing the information stored in the tables, and displaying the accessed information on the first locally operated computer system.

15. The method of claim 12, additionally comprising the steps of:

accessing the information stored in the tables, and printing at least one report including the reservation information from the first locally operated computer system.

16. The method of claim 9, additionally comprising the step of:

displaying the information stored in the first locally operated computer system.

17. The method of claim 9, additionally comprising the step of:

printing at least one report including the information stored in the first locally operated computer system.

18. The method of claim 9, additionally comprising the steps of:

accessing an existing customer profile corresponding to each traveler stored in the first locally operated computer system;

updating the customer profile with any new traveler identification information;

transferring the updated customer profile to the computer reservation system when requesting the access to the computer reservation system;

accessing an existing customer profile corresponding to each traveler stored in the computer reservation system;

updating each computer reservation system customer profile with the new traveler identification information;

further selecting other locally operated computer systems that have an existing customer profile corresponding to each traveler that requires updating;

preparing an electronic message indicating that the computer reservation system customer profile was updated;

transmitting the electronic message to the selected locally operated computer systems;

receiving the electronic message at the selected locally operated computer systems;

accessing the computer reservation system updated customer profile information; and updating the corresponding customer profile in the selected locally operated computer systems.

19. The method of claim 18, wherein the computer reservation system updated customer profile information is accessed from the computer reservation system.

20. The method of claim 18, wherein the computer reservation system updated customer profile information is accessed from the electronic message.

* * * * *